US009282252B2

(12) United States Patent
Scarff

(10) Patent No.: US 9,282,252 B2
(45) Date of Patent: Mar. 8, 2016

(54) DUAL LENS DIGITAL ZOOM

(71) Applicant: DigitalOptics Corporation, San Jose, CA (US)

(72) Inventor: Lawrence Alan Scarff, Burlington, MA (US)

(73) Assignee: DigitalOptics Corporation, San Jose, CA (US)

( * ) Notice: Subject to any disclaimer, the term of this patent is extended or adjusted under 35 U.S.C. 154(b) by 0 days.

(21) Appl. No.: 14/046,655

(22) Filed: Oct. 4, 2013

(65) Prior Publication Data

US 2014/0036112 A1    Feb. 6, 2014

Related U.S. Application Data

(63) Continuation of application No. 12/435,080, filed on May 4, 2009, now Pat. No. 8,553,106.

(51) Int. Cl.
| | |
|---|---|
| *H04N 5/232* | (2006.01) |
| *H04N 5/225* | (2006.01) |
| *H04N 5/262* | (2006.01) |

(52) U.S. Cl.
CPC ......... *H04N 5/23296* (2013.01); *H04N 5/2258* (2013.01); *H04N 5/2628* (2013.01)

(58) Field of Classification Search
CPC ................................. H04N 9/097; G02B 5/04
USPC ..................... 348/335–344; 396/74
See application file for complete search history.

(56) References Cited

U.S. PATENT DOCUMENTS

| | | |
|---|---|---|
| 5,748,371 A | 5/1998 | Cathey, Jr. et al. |
| 6,069,738 A | 5/2000 | Cathey, Jr. et al. |

(Continued)

FOREIGN PATENT DOCUMENTS

| | | |
|---|---|---|
| WO | WO 02/099502 A1 | 12/2002 |
| WO | WO/03/076984 | 9/2003 |

(Continued)

OTHER PUBLICATIONS

The "angle of view of a lens" calculator is found on webpage http://imaginatorium.org/stuff/angle.htm as seen on Feb. 8, 2007 via the WayBack Machine (http://wayback.archive.org), URL:http://web.archive.org/web/20070208160219/http://www.imaginatorium.org/stuff/angle.htm.*

(Continued)

*Primary Examiner* — Sinh Tran
*Assistant Examiner* — Mark Monk
(74) *Attorney, Agent, or Firm* — Larry E. Henneman, Jr.; Gregory P. Gibson; Henneman & Associates, PLC

(57) ABSTRACT

A camera with a pair of lens/sensor combinations, the two lenses having different focal lengths, so that the image from one of the combinations has a field of view approximately two to three times greater than the image from the other combination. As a user of the camera requests a given amount of zoom, the zoomed image provided will come from the lens/sensor combination having the field of view that is next larger than the requested field of view. Thus, if the requested field of view is less than the smaller field of view combination, the zoomed image will be created from the image captured by that combination, using cropping and interpolation if necessary. Similarly, if the requested field of view is greater than the smaller field of view combination, the zoomed image will be created from the image captured by the other combination, using cropping and interpolation if necessary.

20 Claims, 1 Drawing Sheet

(56) References Cited

U.S. PATENT DOCUMENTS

| | | | |
|---|---|---|---|
| 6,501,909 B1* | 12/2002 | Nishimura et al. | 396/74 |
| 6,804,460 B1* | 10/2004 | Oshima et al. | 396/74 |
| 7,031,054 B2 | 4/2006 | Cathey, Jr. et al. | |
| 7,218,448 B1 | 5/2007 | Cathey, Jr. et al. | |
| 7,436,595 B2 | 10/2008 | Cathey, Jr. et al. | |
| 2004/0179125 A1* | 9/2004 | Nagaoka | 348/335 |
| 2006/0187338 A1* | 8/2006 | May et al. | 348/375 |
| 2008/0018774 A1* | 1/2008 | Nakajima et al. | 348/333.08 |
| 2010/0045825 A1 | 2/2010 | Hatori et al. | |
| 2014/0118569 A1 | 5/2014 | Griffith et al. | |

FOREIGN PATENT DOCUMENTS

| | | |
|---|---|---|
| WO | WO/2004/063989 | 7/2004 |
| WO | WO/2006/095110 | 9/2006 |
| WO | WO/2007/054938 | 5/2007 |
| WO | WO/2007/113798 | 10/2007 |
| WO | WO/2007/113799 | 10/2007 |
| WO | WO/2007/113800 | 10/2007 |
| WO | WO/2009/019362 | 2/2009 |
| WO | WO/2009/019364 | 2/2009 |

OTHER PUBLICATIONS

CN Application No. 201080012566.6, Office Action dated Jul. 26, 2013 (English translation).
CN Application No. 201080012566.6, Office Action dated Apr. 3, 2014 (English translation).
U.S. Appl. No. 14/035,635, Office Action dated Mar. 26, 2014.
U.S. Appl. No. 14/035,635, Notice of Allowance dated Jul. 16, 2014.
U.S. Appl. No. 14/570,736, Office Action dated Jan. 29, 2015.
Dowski & Cathey; "Extended Depth of Field Through Wavefront Coding," Applied Optics, 34, 11, p. 1859-1866 (1995).
Smith, Warren J.; "Modern Optical Engineering, 3rd Edition", The McGraw-Hill Companies, Chapter 6, (Jul. 2000).
U.S. Appl. No. 14/570,736, Notice of Allowance dated May 21, 2015.
CN Application No. 201080012566.6, Notification of Reexamination dated May 22, 2015 (with English translation).

* cited by examiner

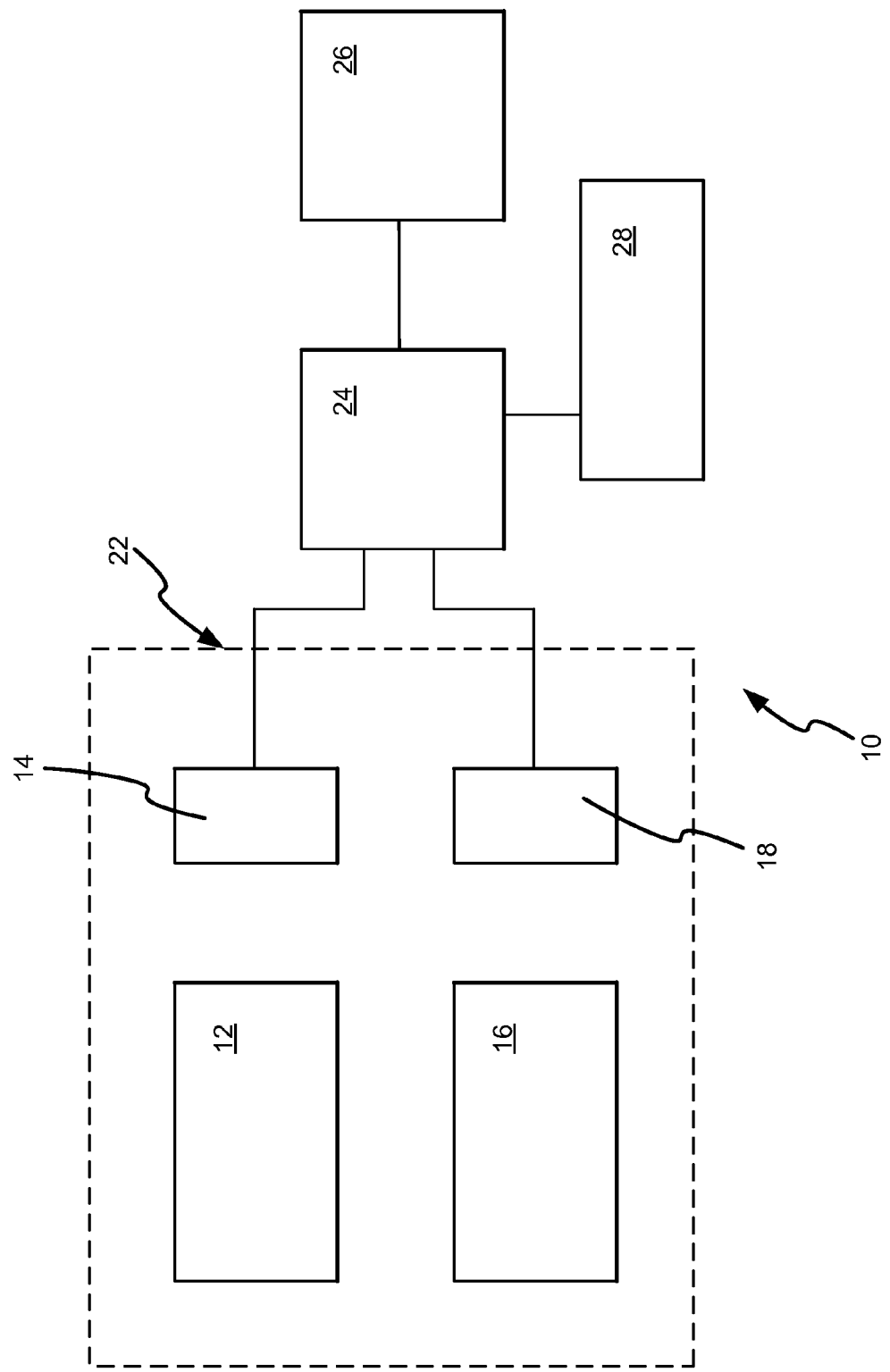

DUAL LENS DIGITAL ZOOM

RELATED APPLICATIONS

This application is a continuation of U.S. patent application Ser. No. 12/435,080 (now U.S. Pat. No. 8,553,106) entitled "Duel Lens Digital Zoom" filed May 4, 2009 by the same inventors, which is incorporated herein by reference in its entirety.

BACKGROUND

Digital camera modules are currently being incorporated into a variety of host devices. Such host devices include cellular telephones, personal data assistants (PDAs), computers, and so forth. Consumer demand for digital camera modules in host devices continues to grow.

Host device manufacturers prefer digital camera modules to be small, so that they can be incorporated into the host device without increasing the overall size of the host device. Further, there is an increasing demand for cameras in host devices to have higher-performance characteristics. One such characteristic that many higher-performance cameras (e.g., standalone digital still cameras) have is the ability to vary the focal length of the camera to increase and decrease the magnification of the image, typically accomplished with a zoom lens, now known as optical zooming. Optical zooming is typically accomplished by mechanically moving lens elements relative to each other, and thus such zoom lens are typically more expensive, larger, and less reliable than fixed focal length lenses. An alternative approach for approximating this zoom effect is achieved with what is known as digital zooming. With digital zooming, instead of varying the focal length of the lens, a processor in the camera crops the image and interpolates between the pixels of the captured image to create a "magnified" but lower-resolution image.

There have been some attempts to use two different lenses to approximate the effect of a zoom lens. It has been done in the past with film cameras in which the user could select one of two different focal lengths to capture an image on film. More recently, a variation on this concept with camera modules has been disclosed in U.S. Pat. Pub. No. 2008/0030592, the entire contents of which are incorporated herein by reference, which discusses a camera module with a pair of sensors, each having a separate lens through which light is directed to the respective sensor. In this publication, the two sensors are operated simultaneously to capture an image. The respective lenses have different focal lengths, so even though each lens/sensor combination is aligned to look in the same direction, each will capture an image of the same subject but with two different fields of view. The images are then stitched together to form a composite image, with the central portion of the composite image being formed by the relatively higher-resolution image taken by the lens/sensor combination with the longer focal length and the peripheral portion of the composite image being formed by a peripheral portion of the relatively lower-resolution image taken by the lens/sensor combination with the shorter focal length. The user selects a desired amount of zoom and the composite image is used to interpolate values therefrom to provide an image with the desired amount of zoom. Unfortunately, the disclosure in this publication is largely conceptual and lacks in certain details that would be needed to provide optimal performance. U.S. Pat. App. No. 61/161,621, the entire contents of which are incorporated herein by reference, discloses improvements and refinements to this concept.

The foregoing examples of the related art and limitations related therewith are intended to be illustrative and not exclusive. Other limitations of the related art will become apparent to those of skill in the art upon a reading of the specification and a study of the drawings.

SUMMARY

Disclosed herein is a camera operated by a user that includes a first sensor that captures a first image; a first lens that directs light to the first sensor, the first lens having a first focal length, wherein the combination of the first sensor and first lens has a first field of view; a second sensor that captures a second image; a second lens that directs light to the second sensor, the second lens having a second focal length that is longer than the first focal length, wherein the combination of the second sensor and second lens has a second field of view, wherein the first field of view is greater than the second field of view; and a zoom control operable by the user to allow the user to request a desired field of view to produce a zoomed image. The combination of the first sensor and the first lens are substantially aligned with the combination of the second sensor and the second lens to allow each to be directed toward the same subject. The zoomed image is the first image if the requested field of view is substantially equal to the first field of view, the zoomed image is produced from the first image by cropping and interpolating the first image if the requested field of view is less than the first field of view and greater than the second field of view, the zoomed image is the second image if the requested field of view is substantially equal to the second field of view, and the zoomed image is produced from the second image by cropping and interpolating the second image if the requested field of view is less than the second field of view.

The camera may further include a third sensor that captures a third image; a third lens that directs light to the third sensor, the third lens having a third focal length that is longer than the second focal length, wherein the combination of the third sensor and third lens has a third field of view, wherein the second field of view is greater than the third field of view. The combination of the third sensor and the third lens may be substantially aligned with the combination of the first sensor and the first lens and the combination of the second sensor and the second lens to allow each to be directed toward the same subject. The zoomed image may be the first image if the requested field of view is substantially equal to the first field of view, the zoomed image may be produced from the first image by cropping and interpolating the first image if the requested field of view is less than the first field of view and greater than the second field of view, the zoomed image may be the second image if the requested field of view is substantially equal to the second field of view, the zoomed image may be produced from the second image by cropping and interpolating the second image if the requested field of view is less than the second field of view and greater than the third field of view, the zoomed image may be the third image if the requested field of view is substantially equal to the third field of view, and the zoomed image may be produced from the third image by cropping and interpolating the third image if the requested field of view is less than the third field of view.

The first field of view may be approximately twice that of the second field of view. The first field of view may be in the range of approximately two to three times that of the second field of view. The zoom control may be used to request a zoomed image in a range, with one end of the range corresponding approximately to the first field of view and the opposite end of the range corresponding approximately to ¼ to ½ of the second field of view.

Also disclosed is a camera operated by a user that includes a sensor that captures an image; a first lens that can direct light to the sensor, the first lens having a first focal length, wherein the combination of the sensor and first lens has a first field of view; a second lens that can direct light to the sensor, the second lens having a second focal length that is longer than the first focal length, wherein the combination of the sensor and second lens has a second field of view, wherein the first field of view is greater than the second field of view; and a zoom control operable by the user to allow the user to request a desired field of view to produce a zoomed image. The first and second lenses can be moved relative to the sensor into one of two different positions so that the sensor can receive either light passing through the first lens or light passing through the second lens. The combination of the sensor and the first lens are substantially aligned with the combination of the sensor and the second lens to allow either to be directed toward the same subject. The zoomed image is the image from the first sensor if the requested field of view is substantially equal to the first field of view, the zoomed image is produced from the image from the first sensor by cropping and interpolating the image from the first sensor if the requested field of view is less than the first field of view and greater than the second field of view, the zoomed image is the image from the second sensor if the requested field of view is substantially equal to the second field of view, and the zoomed image is produced from the image from the second sensor by cropping and interpolating the image from the second sensor if the requested field of view is less than the second field of view.

The first field of view may be approximately twice that of the second field of view. The first field of view may be in the range of approximately two to three times that of the second field of view. The zoom control may be used to request a zoomed image in a range, with one end of the range corresponding approximately to the first field of view and the opposite end of the range corresponding approximately to ¼ to ½ of the second field of view. The lenses may be moved relative to the sensor manually by the user. The lenses may be moved relative to the sensor automatically by the camera when the field of view requested by the user changes between using the image from one of the combinations to the other of the combinations.

BRIEF DESCRIPTION OF THE DRAWINGS

FIG. 1 is a block diagram of a camera.

DETAILED DESCRIPTION

The following description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

A camera 10 is shown in FIG. 1. The camera 10 may include a first lens 12 having a relatively-shorter focal length and a first sensor 14 that are located proximate to and substantially aligned with a second lens 16 having a relatively-longer focal length and a second sensor 18. By having the combined first lens and first sensor aligned with the combined second lens and second sensor, the sensors can each obtain an image of substantially the same subject. Of course, due to the different focal lengths of the lenses 12 and 16, the first sensor 14 will obtain an image of the subject with a relatively-wider field of view (FOV) as compared to the relatively-narrower FOV of the image obtained by the second sensor 18. In one example, the first FOV may be in the range of two to three times as large as the second FOV. In another example, the first FOV may be approximately twice the second FOV.

In most cases, each sensor 14 and 18 may perform certain basic image processing algorithms such as white balancing, and so forth. The lenses 12 and 16 could be made of any acceptable material, including plastic (e.g., injection-molded plastic), glass, optical ceramic, diffractive elements, or a composite.

In one example, the lens 16 may be a lens having a focal length of 7.2 mm and a field-of-view (FOV) of 32 degrees, while the lens 12 may be a lens having a focal length of 3.62 mm and an FOV of 63 degrees. These lens specifications are merely exemplary and any other suitable lens characteristics could be acceptable. In addition, one or both of the lenses 12 and 16 could be variable focal length (zoom) lenses.

In one example, the two lenses 12 and 16 may have the same f-number so that the illuminance of the light received at the sensors 14 and 18 is equivalent. With equivalent illuminance, the sensors can be operated at similar levels of amplification and with similar exposure times. In this manner, the separate images captured by the separate sensors 14 and 18 can be of similar levels of brightness and contrast. By having similar levels of amplification, the background noise in each image will be similar. By having similar exposure times, artifacts in each image due to subject motion will be similar. By maintaining similarity as to these two characteristics in the two images, transitions between the two images will be more acceptable to the user. In another example, the lenses 12 and 16 may be chosen to provide the same depth of field for each lens/sensor combination.

In one example, each of the sensors is a Bayer sensor, which uses a color filter array over the array of separate pixels, as is well known. Such sensors sense green light at every other pixel, with the intervening pixels alternating between red pixels and blue pixels. The raw sensed signals are later provided to a demosaicing algorithm, which interpolates between the pixels to obtain a full color signal for each pixel. However, the invention is not limited to use with a Bayer sensor and will work equally well with sensors having a different color filter array, cameras based on time-sequential color, cameras using beamsplitters and separate sensors for each color channel, and other camera architectures.

In some cases, the camera 10 may be considered to include only the functional portions described above. In other cases, these portions (referred to collectively as a camera module 22) may also be combined with certain downstream components as part of the camera 10. In such case, the camera 10 may also include an image signal processor (ISP) 24, a display 26, and user interface controls 28. Of course, as is well known in the camera industry, cameras may also typically include several other components that are omitted here for simplification. For example, as non-limiting examples, these other components may include batteries, power supplies, an interface for the application of external power, a USB or other interface to a computer and/or printer, a light source for flash photography, auto-focus and image stability controls, internal memory, one or more ports for receiving an external memory card or device (e.g., an SD or xD memory card), and in the case of the use of a camera in a mobile phone, a microphone, speaker, transmitter/receiver, and an interface for an external microphone and speaker (e.g., a Bluetooth headset).

The user interface controls 28 may include conventional controls that are used to operate the camera, including controls to instruct the camera to capture one or more images, as well as to manipulate the images, and many other functions. One of the controls allows the user to digitally zoom the camera to increase or decrease the field of view (FOV) of the camera. The user can zoom the image out to the FOV of the image from the first sensor 14 at one end of the zooming range and to a point that may be somewhere between ½ and ¼ of the FOV of the image from the second sensor 18 at the other end of the zooming range. The zoomed image may simply be the first image if the requested field of view is substantially equal to the first field of view. The zoomed image is produced from the first image by cropping and interpolating the first image if the requested field of view is less than the first field of view and greater than the second field of view. The zoomed image is the second image if the requested field of view is substantially equal to the second field of view. The zoomed image is produced from the second image by cropping and interpolating the second image if the requested field of view is less than the second field of view.

The zooming range may be limited on one end by the FOV of the first sensor. Although the camera 10 could be designed to allow the user to continue to zoom out to a "FOV" greater than that of the first lens/sensor, the image would in fact get smaller as the image from the first sensor was merely shrunk in size and no extra image information would be brought at the margins of the image, because there is no wider FOV image data to use. The zooming range may be limited on the opposite end by the amount of digital zooming that is deemed to be acceptable to users. Due to the image interpolation that occurs, it may be desirable to limit the digital zooming to a FOV that is somewhere between ½ and ¼ of the FOV of the image from the second sensor 18.

Alternatively, the camera module 22 could include one or more ISPs located thereon. They could be separate from or integrated into the sensors. Further, while the lenses 12 and 16 described herein are fixed focal length, either or both could be variable focal length (zoom) lenses.

Alternatively, the camera 10 could be provided with a third lens/sensor combination that is aligned with the first two lens/sensor combinations. This third lens/sensor combination may have a field of view that is still smaller than that of the second lens/sensor combination. As the camera was zoomed by the user, the zoomed image would transition between being formed from the first image, the second image, and the third image in a similar manner to that described above. In such case, the zoom range might be from the field of view of the first lens/sensor combination to ½ to ¼ of the field of view of the third lens/sensor combination.

As another alternative, there may be only one sensor and the two (or more) lenses may be moved relative to the sensor to allow an image to be captured from either the combination of the first lens and the one sensor or from the combination of the second lens and the one sensor. This relative movement of the lenses and sensor could be achieved by the user sliding or actuating some type of mechanical member associated therewith or it could be achieved by the camera automatically moving the lenses relative to the sensor when the requested amount of zooming causes the zoomed image to switch from coming from one combination to coming from the other combination. As a further variation to all of this, instead of moving the lenses or sensor, the light path could be redirected by a mirror or the like to cause light from a selected lens to impinge upon the sensor.

Any other combination of all the techniques discussed herein is also possible. The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

I claim:

1. A camera operated by a user, comprising:
a sensor that captures an image;
a first lens that can direct light to the sensor, the first lens having a first focal length, wherein the combination of the sensor and first lens has a first field of view;
a second lens that can direct light to the sensor, the second lens having a second focal length that is shorter than the first focal length, wherein the combination of the sensor and second lens has a second field of view, wherein the combination of the first field of view and the second field of view comprises a field of view that is greater than the first field of view; and
a zoom control operable by the user to allow the user to request a desired field of view to produce a zoomed image; and
wherein the first and second lenses can be moved into and out of optical alignment with the sensor so that the sensor receives light passing through the first lens including the first field of view when the first lens is aligned with the sensor and light passing through the second lens including the second field of view when the second lens is aligned with the sensor at various focal distances;
wherein the combination of the sensor and the first lens are aligned with the combination of the sensor and the second lens to allow the camera to focus from a same focus distance at said first field of view through said first lens according to said first focal length and at said second field of view through said second lens according to said second focal length, respectively;
wherein the zoomed image comprises the image focused to the sensor from the first lens if the requested field of view is equal to the first field of view, the zoomed image is produced from the image focused to the sensor from the first lens by cropping and interpolating the image focused to the sensor from the first lens if the requested field of view is within but less than the first field of view, and wherein the zoomed image comprises the image focused to the sensor from the second lens if the requested field of view is equal to the second field of view, and the zoomed image is produced from the image focused to the sensor from the second lens by cropping and interpolating the image focused to the sensor from the second lens if the requested field of view is within but less than the second field of view and greater than the first field of view; and
wherein the depth of field for the combination of the sensor and the first lens is the same as the depth of field for the combination of the sensor and the second lens.

2. A camera as defined in claim 1, wherein the second field of view is twice that of the first field of view.

3. A camera as defined in claim 1, wherein the second field of view is in the range of two to three times that of the first field of view.

4. A camera as defined in claim 1, wherein the zoom control can be used to request the zoomed image in a range, with one end of the range corresponding to the second field of view and the opposite end of the range corresponding to ¼ to ½ of the first field of view.

5. A camera as defined in claim 1, wherein the first and second lenses are moved into and out of optical alignment with the sensor automatically by the camera when the field of view requested by the user changes between using the image from one of the combinations to the other of the combinations.

6. A camera operated by a user, comprising:
a sensor that captures an image;
a first lens that can direct light to the sensor, the first lens having a first focal length, wherein the combination of the sensor and first lens has a first field of view;
a second lens that can direct light to the sensor, the second lens having a second focal length that is shorter than the first focal length, wherein the combination of the sensor and second lens has a second field of view, wherein the combination of the first field of view and the second field of view comprises a field of view that is greater than the first field of view; and
a zoom control operable by the user to allow the user to request a desired field of view to produce a zoomed image; and
wherein the first and second lenses can be moved relative to the sensor into and out of one of multiple different positions where the sensor receives light passing through the first lens including the first field of view when the first lens is in the one of the multiple positions and light passing through the second lens including the second field of view when the second lens is in the one of the multiple positions at various focal distances;
wherein the combination of the sensor and the first lens are aligned with the combination of the sensor and the second lens to allow the camera to focus from a same focus distance at said first field of view through said first lens according to said first focal length and at said second field of view through said second lens according to said second focal length, respectively;
wherein the zoomed image comprises the image focused to the sensor from the first lens if the requested field of view is equal to the first field of view, the zoomed image is produced from the image focused to the sensor from the first lens by cropping and interpolating the image focused to the sensor from the first lens if the requested field of view is within but less than the first field of view, and wherein the zoomed image comprises the image focused to the sensor from the second lens if the requested field of view is equal to the second field of view, and the zoomed image is produced from the image focused to the sensor from the second lens by cropping and interpolating the image focused to the sensor from the second lens if the requested field of view is within but less than the second field of view and greater than the first field of view; and
wherein the depth of field for the combination of the sensor and the first lens is the same as the depth of field for the combination of the sensor and the second lens.

7. A camera as defined in claim 6, wherein the second field of view is twice that of the first field of view.

8. A camera as defined in claim 6, wherein the second field of view is in the range of two to three times that of the first field of view.

9. A camera as defined in claim 6, wherein the zoom control can be used to request the zoomed image in a range, with one end of the range corresponding to the second field of view and the opposite end of the range corresponding to ¼ to ½ of the first field of view.

10. A camera as defined in claim 6, wherein the first and second lenses are moved relative to the sensor automatically by the camera when the field of view requested by the user changes between using the image from one of the combinations to the other of the combinations.

11. In a camera operated by a user, a method comprising:
capturing an image with a sensor;
directing light to the sensor with a first lens, the first lens having a first focal length, wherein the combination of the sensor and first lens has a first field of view;
directing light to the sensor with a second lens, the second lens having a second focal length that is shorter than the first focal length, wherein the combination of the sensor and second lens has a second field of view, wherein the combination of the first field of view and the second field of view comprises a field of view that is greater than the first field of view; and
using a zoom control operable by the user to allow the user to request a desired field of view to produce a zoomed image; and
wherein the first and second lenses can be moved into and out of optical alignment with the sensor so that the sensor receives light passing through the first lens including the first field of view when the first lens is aligned with the sensor and light passing through the second lens including the second field of view when the second lens is aligned with the sensor at various focal distances;
wherein the combination of the sensor and the first lens are aligned with the combination of the sensor and the second lens to allow the camera to focus from a same focus distance at said first field of view through said first lens according to said first focal length and at said second field of view through said second lens according to said second focal length, respectively;
wherein the zoomed image comprises the image focused to the sensor from the first lens if the requested field of view is equal to the first field of view, the zoomed image is produced from the image focused to the sensor from the first lens by cropping and interpolating the image focused to the sensor from the first lens if the requested field of view is within but less than the first field of view, and wherein the zoomed image comprises the image focused to the sensor from the second lens if the requested field of view is equal to the second field of view, and the zoomed image is produced from the image focused to the sensor from the second lens by cropping and interpolating the image focused to the sensor from the second lens if the requested field of view is within but less than the second field of view and greater than the first field of view; and
wherein the depth of field for the combination of the sensor and the first lens is the same as the depth of field for the combination of the sensor and the second lens.

12. A method as defined in claim 11, wherein the second field of view is twice that of the first field of view.

13. A method as defined in claim 11, wherein the second field of view is in the range of two to three times that of the first field of view.

14. A method as defined in claim 11, wherein the zoom control can be used to request the zoomed image in a range, with one end of the range corresponding to the second field of view and the opposite end of the range corresponding to ¼ to ½ of the first field of view.

15. A method as defined in claim 11, wherein the first and second lenses are moved into and out of optical alignment with the sensor automatically by the camera when the field of view requested by the user changes between using the image from one of the combinations to the other of the combinations.

16. In a camera operated by a user, a method comprising:
capturing an image with a sensor;
directing light to the sensor with a first lens, the first lens having a first focal length, wherein the combination of the sensor and first lens has a first field of view;
directing light to the sensor with a second lens, the second lens having a second focal length that is shorter than the first focal length, wherein the combination of the sensor and second lens has a second field of view, wherein the combination of the first field of view and the second field of view comprises a field of view that is greater than the first field of view; and
using a zoom control operable by the user to allow the user to request a desired field of view to produce a zoomed image; and
wherein the first and second lenses can be moved relative to the sensor into and out of one of multiple different positions where the sensor receives light passing through the first lens including the first field of view when the first lens is in the one of the multiple positions and light passing through the second lens including the second field of view when the second lens is in the one of the multiple positions at various focal distances;
wherein the combination of the sensor and the first lens are aligned with the combination of the sensor and the second lens to allow the camera to focus from a same focus distance at said first field of view through said first lens according to said first focal length and at said second field of view through said second lens according to said second focal length, respectively;
wherein the zoomed image comprises the image focused to the sensor from the first lens if the requested field of view is equal to the first field of view, the zoomed image is produced from the image focused to the sensor from the first lens by cropping and interpolating the image focused to the sensor from the first lens if the requested field of view is within but less than the first field of view, and wherein the zoomed image comprises the image focused to the sensor from the second lens if the requested field of view is equal to the second field of view, and the zoomed image is produced from the image focused to the sensor from the second lens by cropping and interpolating the image focused to the sensor from the second lens if the requested field of view is within but less than the second field of view and greater than the first field of view; and
wherein the depth of field for the combination of the sensor and the first lens is the same as the depth of field for the combination of the sensor and the second lens.

17. A method as defined in claim 16, wherein the second field of view is twice that of the first field of view.

18. A method as defined in claim 16, wherein the second field of view is in the range of two to three times that of the first field of view.

19. A method as defined in claim 16, wherein the zoom control can be used to request the zoomed image in a range, with one end of the range corresponding to the second field of view and the opposite end of the range corresponding to ¼ to ½ of the first field of view.

20. A method as defined in claim 16, wherein the first and second lenses are moved relative to the sensor automatically by the camera when the field of view requested by the user changes between using the image from one of the combinations to the other of the combinations.

* * * * *